United States Patent
Goupil et al.

(10) Patent No.: US 8,203,327 B2
(45) Date of Patent: *Jun. 19, 2012

(54) DEVICE FOR COUNTING OSCILLATIONS OF AN OSCILLATING TEMPORAL SIGNAL

(75) Inventors: Philippe Goupil, Beaupuy (FR); Pascal Traverse, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 454 days.

This patent is subject to a terminal disclaimer.

(21) Appl. No.: 12/484,740

(22) Filed: Jun. 15, 2009

(65) Prior Publication Data

US 2009/0309574 A1 Dec. 17, 2009

(30) Foreign Application Priority Data

Jun. 16, 2008 (FR) .................................. 08 03341

(51) Int. Cl.
*G06M 1/10* (2006.01)

(52) U.S. Cl. ....... 324/76.16; 377/19; 377/115; 377/116; 702/182; 702/183; 702/184; 702/185

(58) Field of Classification Search ............... 324/76.16; 377/19, 115, 116

See application file for complete search history.

(56) References Cited

U.S. PATENT DOCUMENTS

| | | | | |
|---|---|---|---|---|
| 3,416,080 A * | 12/1968 | Wright et al. | ............... | 324/76.16 |
| 3,453,541 A * | 7/1969 | Pardoe | ........................ | 324/76.17 |
| 3,560,851 A * | 2/1971 | Gaines et al. | ............... | 324/76.17 |
| 3,665,399 A * | 5/1972 | Zehr et al. | ................ | 340/870.09 |
| 3,697,730 A * | 10/1972 | Clack et al. | ..................... | 377/19 |
| 3,727,130 A * | 4/1973 | Estienne | ..................... | 324/76.16 |
| 3,939,331 A * | 2/1976 | Theurer et al. | ................ | 702/168 |
| 4,099,048 A * | 7/1978 | Eichenlaub | ....................... | 377/54 |
| 4,165,458 A * | 8/1979 | Koizumi et al. | ................. | 377/19 |
| 4,288,687 A * | 9/1981 | Zinn | ............................... | 377/19 |
| 4,365,193 A * | 12/1982 | Bollero et al. | .................. | 324/102 |
| 4,467,433 A * | 8/1984 | Claassen et al. | ................ | 702/66 |
| 4,896,339 A * | 1/1990 | Fukumoto | ........................ | 377/19 |
| 4,974,241 A * | 11/1990 | McClure et al. | .............. | 377/116 |
| 5,293,774 A * | 3/1994 | Ratherham | ................ | 73/112.01 |
| 5,374,014 A * | 12/1994 | Traverse et al. | ................ | 244/227 |
| 5,398,270 A * | 3/1995 | Cho et al. | .......................... | 377/39 |
| 5,806,805 A * | 9/1998 | Elbert et al. | ................... | 244/195 |
| 6,163,266 A * | 12/2000 | Fasullo et al. | .................. | 340/664 |
| 7,251,582 B2 * | 7/2007 | Singh et al. | .................... | 702/183 |
| 7,283,926 B2 * | 10/2007 | Wu | ................................ | 702/159 |
| 7,433,803 B2 * | 10/2008 | Circello et al. | ............... | 702/186 |
| 7,693,616 B2 * | 4/2010 | Beutler et al. | ..................... | 701/3 |
| 7,725,224 B2 * | 5/2010 | Goupil | ............................ | 701/29 |
| 7,797,115 B2 * | 9/2010 | Tasher et al. | ...................... | 702/57 |
| 7,945,399 B2 * | 5/2011 | Nosovitsky et al. | ............ | 702/57 |
| 2007/0124038 A1 * | 5/2007 | Goupil | ............................ | 701/29 |
| 2008/0033695 A1 * | 2/2008 | Sahara et al. | .................. | 702/185 |
| 2008/0232538 A1 * | 9/2008 | Goishi | ............................ | 377/19 |
| 2009/0046827 A1 * | 2/2009 | Tasher et al. | ..................... | 377/19 |

FOREIGN PATENT DOCUMENTS

FR 2 893 911 6/2007

* cited by examiner

*Primary Examiner* — Huy Q Phan
*Assistant Examiner* — Lamarr Brown
(74) *Attorney, Agent, or Firm* — Novak Druce + Quigg

(57) ABSTRACT

A device for counting oscillations of an oscillating temporal signal. The device comprises means for counting all the alternate crossings of a positive threshold value and of a negative threshold value by a monitored time signal.

9 Claims, 6 Drawing Sheets

DEVICE FOR COUNTING OSCILLATIONS OF AN OSCILLATING TEMPORAL SIGNAL

CROSS-REFERENCE TO RELATED APPLICATION

This application claims the benefit of French Patent Application 08 03341, filed on Jun. 16, 2008, which is hereby incorporated by reference.

BACKGROUND OF THE INVENTION

The present invention relates to a device for counting oscillations of an oscillating time signal. The present invention applies to any type of oscillating time signal, in particular a sinusoidal signal or a triangular signal, and it is intended for the counting of a limited number of oscillations (or of periods) of this time signal in a given time window.

DESCRIPTION OF THE PRIOR ART

Such a device can offer a very large number of applications, and in particular be used for the detection of oscillatory failures, in particular in a flight control system of an aircraft. From document FR-2 893 911, a method of detecting oscillatory failures of this type is known.

BRIEF DESCRIPTION OF THE INVENTION

According to the invention, said device for counting oscillations of a time signal is noteworthy in that it comprises:
  a first comparator which receives said time signal and which compares it to a first threshold value which is positive;
  a first AND logic gate, a first input of which is linked to the output of said first comparator;
  a first two-input bistable flip-flop, a signal input of which is linked to the output of said first AND logic gate;
  a first inverter which is mounted between the output of said first bistable flip-flop and the second input of said first AND logic gate;
  a second comparator which also receives said time signal and which compares it to a second threshold value which is negative, the output of said second comparator being linked to an initialization input of said first bistable flip-flop;
  a second AND logic gate, a first input of which is linked to the output of said second comparator;
  a second two-input bistable flip-flop, a signal input of which is linked to the output of said second AND logic gate, and an initialization input of which is linked to the output of said first comparator;
  a second inverter which is mounted between the output of said second bistable flip-flop and the second input of said second AND logic gate;
  an OR logic gate, the two inputs of which are linked respectively to the outputs of said first and second AND logic gates, and the output of which controls a switching means to generate a unit value intended to increment a counter, each time said time signal exceeds, alternatively, one of said first and second threshold values; and
  said counter which is thus incremented and which handles the counting of the oscillations of said oscillating time signal.

Thus, thanks to the invention, a device is obtained which makes it possible to count, in a particularly simple and effective manner, all the oscillations of any oscillating time signal, for example of sinusoidal form or of triangular form.

In the context of the present invention, an oscillation can be characterized by crossings of threshold values, successively positive and negative, such as the abovementioned first and second threshold values. Preferably, said first and second threshold values, one of which is positive and the other negative, have the same absolute value. Obviously, these first and second threshold values can have different absolute values.

As specified hereinbelow, the device for counting oscillations, according to the invention, offers many advantages, and in particular:
  it is simple from an algorithmic point of view;
  it offers a limited calculating cost, which means that it can be implemented in real time in a computer, for example a flight control computer of an aircraft, while avoiding overloading that computer;
  it avoids having to use a frequency analysis, which is much more complex; and
  it does not require any specific sensor or gauge and it has no negative impact on the weight budget, particularly when it is used to detect oscillatory failures in a flight control system of an aircraft.

In a particular embodiment, said oscillation counting device comprises, in addition, at least one bandpass filtering means for filtering the time signal before transmitting it to said first and second comparators.

Furthermore, as a variant or complement, said oscillation counting device comprises, in addition, a high-pass filtering means for filtering the time signal before transmitting it to said first and second comparators. The latter embodiment makes it possible, for example, to filter the time signal, when it does not present a zero average, to bring it to a zero average, before applying to it the abovementioned count according to the invention.

Moreover, in a preferred embodiment, said oscillation counting device comprises, in addition, a comparison means for comparing the value obtained from said counter with a predetermined value and for sending an output signal immediately said value obtained from said counter, which represents the number of half-periods of oscillations counted, becomes greater than said predetermined value.

This preferred embodiment makes it possible to detect the overshoot by the monitored signal of a predetermined number of oscillations. Such an overshoot can in particular be due to an oscillatory failure as described hereinabove.

In this preferred embodiment, said counting device advantageously comprises, in addition:
  means for previously breaking down the oscillating time signal into a plurality of frequency bands; and
  means for performing a separate count in each duly formed frequency band.

This makes it possible to set the detections differently in each frequency band and make the detection more robust.

Furthermore, in a particular embodiment, said counting device comprises, in addition, a delay unit which stores a unit value at the output of the OR logic gate for a predetermined duration before sending it to an auxiliary means mounted at the output of said counter to decrement the latter as appropriate. This particular embodiment makes it possible to count only the oscillations above a certain frequency and avoid keeping the transient threshold overshoots for too long in memory. In the case of a detection of oscillatory failures, such transient threshold overshoots are not due to a failure and can lead to a false alarm.

The counting device according to the invention, as described hereinabove, can be used in many different applications. It can in particular be employed to check the validity of a measurement of a sensor or to detect an oscillation of any signal.

However, in the preferred application, said counting device is used in the detection of oscillatory failures relating to at least one position-mode servo-control subsystem of a control service of an aircraft. In this case, the present invention can be applied to a servo-control subsystem:

which is designed to servo-control the position of all types of aircraft control surfaces, such as ailerons, spoilers or an elevator for example;

which is part of an electrical flight control system of the aircraft; and which comprises:
  said control surface which is mobile, and the position of which relative to the aircraft is set by at least one actuator;
  said actuator (or servo-control) which sets the position of said control surface, according to at least one received actuation order;
  at least one sensor which measures the actual position of said control surface; and
  a computer which generates a control surface actuation order, transmitted to said actuator, in particular from said measured actual position and a control order calculated by an automatic pilot or based on the action of the pilot on a control column and the inertial status of the aircraft.

It is known that such a servo-control subsystem comprises electrical components which, in a failure mode, are liable to generate a spurious signal which can cause the servo-controlled control surface to oscillate. Such a phenomenon is called "oscillatory failure". One possible cause of the oscillation is the malfunction or the breakdown of a mechanical part of the servo-control.

The present invention relates to a device for automatically detecting an oscillatory failure of the abovementioned type. To this end, this automatic detection device comprises:

first means for estimating, using said control surface control order, a theoretical position corresponding to a reference position of said control surface in the absence of failure;

second means for calculating the difference between said theoretical position estimated by said first means and the actual position measured by said sensor so as to form a residual value; and third means for:

comparing this residual value to at least one predetermined threshold value;

performing a count of all the successive and alternate overshoots of said predetermined threshold value by said residual value; and detecting an oscillatory failure immediately the number resulting from said count becomes greater than a predetermined number.

According to the invention, said device for automatically detecting an oscillatory failure in a control subsystem of an aircraft control surface is noteworthy in that said third means comprise an oscillation counting device, such as that mentioned above.

The present invention also relates to an electrical flight control system of an aircraft, of the type comprising:

a set of information sources which generate in real time information intended for a position-mode servo-control subsystem of a control surface and which comprise, for example, a control column and sensors that can measure different parameters of the aircraft, such as the angle of incidence for example; and at least one position-mode servo-control subsystem of this control surface, of the type mentioned above.

According to the invention, this electrical flight control system is noteworthy in that it comprises, in addition, at least one device for automatically detecting oscillatory failures, as described previously.

BRIEF DESCRIPTION OF THE DRAWINGS

The figures of the appended drawing will give a clear understanding of how the invention can be implemented. In these figures, identical references designate similar elements.

DESCRIPTION OF THE PREFERRED EMBODIMENTS

Figure 1:
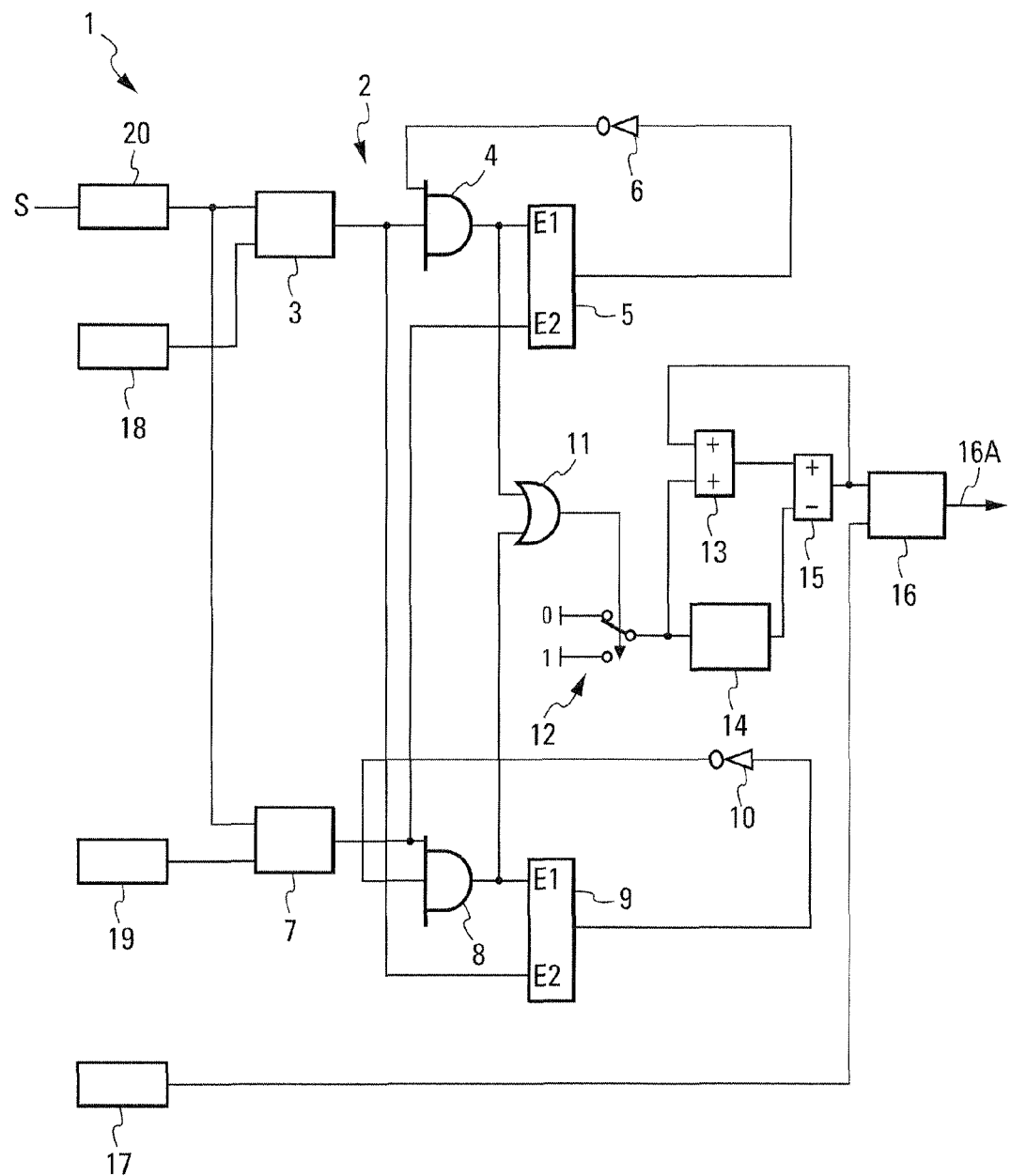
FIG. 1 is the block diagram of a device for counting oscillations of an oscillating time signal, according to the invention.

The device 1 according to the invention and diagrammatically represented in FIG. 1 is designed to perform the counting of any oscillating time signal S, for example of sinusoidal form or of triangular form.

In the context of the present invention, an oscillation can be characterized by crossings of threshold values, successively positive and negative, such as the threshold values VS1 and VS2 specified hereinbelow.

According to the invention, said counting device 1 comprises at least one counting assembly 2 which comprises:

a comparator 3 which receives said time signal S to be monitored and which compares it to a threshold value VS1 which is positive and which is supplied by a means 18, for example a storage means or a data input means;

an AND logic gate 4, a first input of which is linked to the output of said comparator 3;

a two-input bistable flip-flop 5, a signal input E1 of which is linked to the output of said AND logic gate 4;

an inverter 6 which is mounted between the output of said bistable flip-flop 5 and the second input of said AND logic gate 4;

a comparator 7 which also receives said time signal S and which compares it to a threshold value VS2 which is negative and which is supplied by a means 19, for example a storage means or a data input means, the output of said comparator 7 being linked to an initialization input E2 of said bistable flip-flop 5;

an AND logic gate 8, a first input of which is linked to the output of said comparator 7;

a two-input bistable flip-flop 9, a signal input E1 of which is linked to the output of said AND logic gate 8, and an initialization input E2 of which is linked to the output of said comparator 3;

an inverter 10 which is mounted between the output of said bistable flip-flop 9 and the second input of said AND logic gate 8;

an OR logic gate 11, the two inputs of which are linked respectively to the outputs of said AND logic gates 4 and 8, and the output of which controls a switching means 12 for generating a unit value ("1") intended to increment a counter 13, each time said time signal S exceeds, alternatively, one of said threshold values VS1 and VS2, as specified hereinbelow; and said counter 13 which is thus incremented and which performs the counting of the oscillations of said oscillating time signal S.

The means 3, 4, 5 and 6 are intended for the detection of a crossing, by the signal S, of the threshold value VS1, and the means 7, 8, 9 and 10 are intended for the detection of a crossing, by the signal S, of the threshold value VS2.

Furthermore, each bistable flip-flop 5 and 9, in the usual manner, presents two stable states (one of which is represented by the binary digit 0 and the other of which is represented by the binary digit 1), and it can toggle from one state to the other, as specified hereinbelow.

The operating principle of the device 1 is as follows. An incrementation of the counter 13 is produced each time a crossing of a threshold value VS1, VS2 is detected. The next incrementation takes place when a crossing of the other threshold value is detected. Consequently, only alternating overshoots which reflect an oscillation are counted, the value VS1 being positive and the value VS2 being negative. Preferably, although not exclusively, said threshold values VS1 and VS2 have the same absolute value S0, that is |VS1|=|VS2|=S0 or VS1=+S0 and VS2=−S0. Each overshoot of a threshold value blocks a flip-flop 5 or 9 in a state which is reset to 0 (reinitialized) only after an overshoot in the other direction. This makes it possible to count only a single unitary value on passing a threshold value VS1 and VS2 and so avoids incrementing the counter 13 throughout the time when the time signal S remains above this threshold value.

Figure 2:
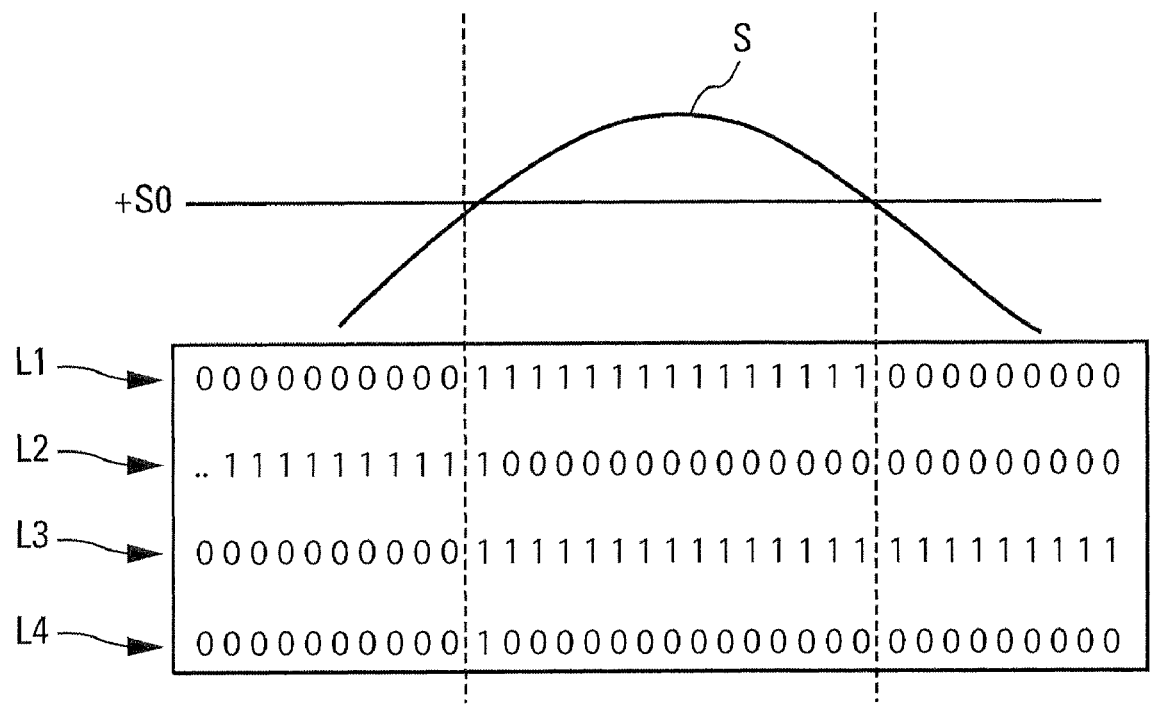
FIG. 2 diagrammatically represents the successive binary states of several elements of the counting device of FIG. 1, in the case of an overshoot of a threshold value.

A crossing of the threshold value +S0 (or VS1) is detailed with reference to FIG. 2 which shows the successive output binary states (of value 0 or 1) of several elements of the device 1 of FIG. 2 (according to the value of the signal S relative to this threshold value +S0), namely:

on the line L1, the output of the comparator 3;
on the line L2, the output of the inverter 6;
on the line L3, the output of the bistable flip-flop 5; and
on the line L4, the output of the AND logic gate 4.

At an instant n, as long as the time signal S is situated below the threshold value VS1, namely +S0, the output of the comparator 3 is in the 0 state (false). The output of the AND logic gate 4 remains at 0. The output of the bistable flip-flop 5 also remains at 0. It is in fact initialized at 0. The output of the inverter 6 gives a 1 state (true) which will be taken into account on the next instant n+1. When the time signal S crosses the threshold value +S0, the output of the comparator 3 changes to the 1 state and, since the second input of the AND logic gate 4 is also at 1, the output of this AND logic gate 4 changes to 1, which provokes the transition to the 1 state of the bistable flip-flop 5. At the next instant, the signal S still being above the threshold value +S0, the output of the comparator 3 is again at 1, but the output of the inverter 6 changes to 0, which results in the transition to 0 of the output of the AND logic gate 4. The latter logic gate 4 therefore makes it possible to count only a single crossing (a unitary value "1") when the threshold +S0 is crossed.

As for the bistable flip-flop 5, it remains blocked in the preceding state, that is, 1. To this end, a property of the bistable flip-flop 5 with priority RESET used in the device 1 is used: when the signal input E1 is at 0, the output at the instant n is equal to the output at the instant n−1. Only a transition to 1 of the initialization input E2 leads to a reset to 0 of the output of the flip-flop 5. This condition is assured by the crossing of the threshold value VS2 (−S0). The bistable flip-flop 5 then changes to 0, which leads to the transition to 1 of the first input of the AND logic gate 4. However, since the signal is no longer greater than the threshold value +S0, the output of the comparator 3 is at 0, and the output of the AND logic gate 4 also changes to 0.

On a crossing of the threshold value −S0, the same logic (as that described hereinabove) is implemented using the means 7, 8, 9 and 10 of the device 1. In this case, it is the crossing of the threshold value +S0 which resets the bistable flip-flop 9, which ensures that only a single crossing is counted on the crossing of the threshold value −S0. The bistable flip-flop 9 is identical to the bistable flip-flop 5 and therefore exhibits the characteristics presented hereinabove.

Moreover, the OR logic gate 11, which has for its inputs the outputs of the AND logic gates 4 and 8, makes it possible to generate a digital value +1 when an overshoot of the threshold value +S0 (VS1) or of the threshold value −S0 (VS2) is detected, thanks to the activation of the switching means 12 (which is brought to the value 1). If no threshold overshoot is signaled, the value 0 is selected.

Furthermore, in a particular embodiment, said counting device 1 comprises, in addition, a delay unit 14 which stores a unit value (value 1) at the output of the OR logic gate 11 for a predetermined duration, before sending it to an auxiliary means 15 mounted at the output of said counter 13 to decrement the latter as appropriate.

This particular embodiment makes it possible to count only the oscillations above a certain frequency and avoid keeping transient threshold overshoots for too long in memory. In the case of a detection of oscillatory failures, such transient threshold overshoots are not due to a failure and can lead to a false alarm. In fact, thanks to said delay unit 14, the counter 13 is decremented by the value that it had T seconds before. T is a function of the minimum frequency fmin from which a detection can be made and of the number of periods P that must be detected so that: T=P/fmin. If T seconds previously, a threshold crossing was detected, the delay unit 14 decrements the counter 13 (by units). On the other hand, if no overshoot has been detected, the counter 13 is not decremented. Said counting assembly 2 therefore counts the number of oscillation half-periods.

Moreover, in a preferred embodiment, said counting device 1 comprises, in addition, a comparison means 16 for comparing the value obtained from said counter 13 (via the means 15) to a predetermined value (which is, for example, stored in a storage or data input means 17) and to send an output signal (via a link 16A) immediately said value obtained from said counter 13, which represents the number of oscillation half-periods counted, becomes greater than said predetermined value.

This preferred embodiment of the device 1 therefore makes it possible to detect the overshoot by the signal S of a predetermined number of oscillations. Such an overshoot can, in particular, be due to an oscillatory failure as specified hereinbelow.

The comparison means 16 therefore verifies whether the value of the counter 13 is greater than the number of confirmation half-periods desired. If such is the case, the Boolean that it produces changes to the 1 state, indicating, for example, the presence of a failure.

The device 1 for counting oscillations, according to the invention, presents numerous benefits, and in particular:

it is simple from an algorithmic point of view;

it offers a limited calculation cost, which means that it can be implemented in real time in a computer, for example a flight control computer of an aircraft, while avoiding overloading that computer;

it avoids having to use a frequency analysis, which is much more complex; and it does not require any specific sensor or gauge and it has no negative impact on the weight budget, particularly when it is used to detect oscillatory failures in a flight control system of an aircraft.

In a particular embodiment, said device 1 for counting oscillations comprises, in addition, a bandpass filtering means forming part of a unit 20 for filtering the time signal S before transmitting it to said comparators 3 and 7.

Furthermore, as a variant or as a complement, said device 1 for detecting oscillations comprises, in addition, a high-pass filtering means also forming part of the unit 20, for filtering the time signal S before transmitting it to said comparators 3 and 7. The latter embodiment makes it possible, for example, to filter the time signal S when it does not present a zero average, to bring it to a zero average, before applying to it the abovementioned counting according to the invention. It is known that, in particular, in the case of an oscillatory failure located in a servo-control loop, the spurious signal generated by a component in failure mode is not necessarily of zero average value.

Figure 3:
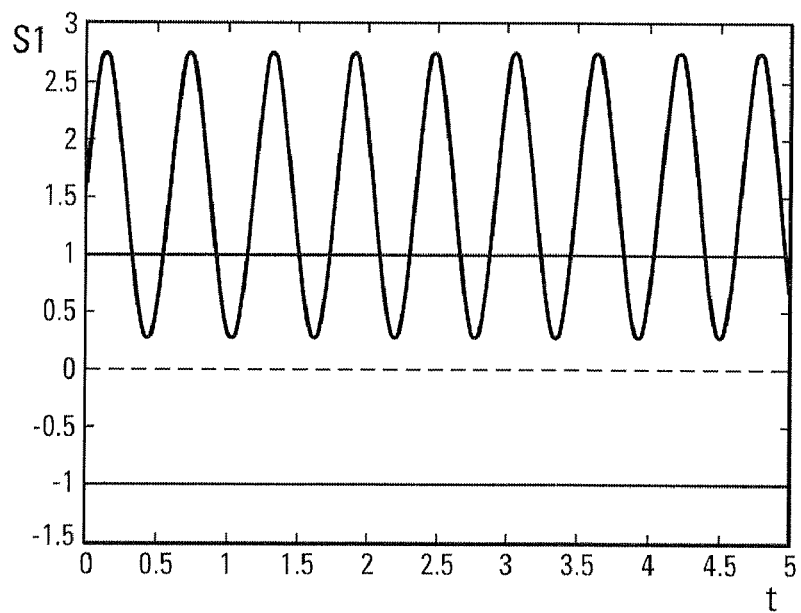
FIG. 3 diagrammatically illustrates a non-zero average oscillatory failure.
Figure 4:
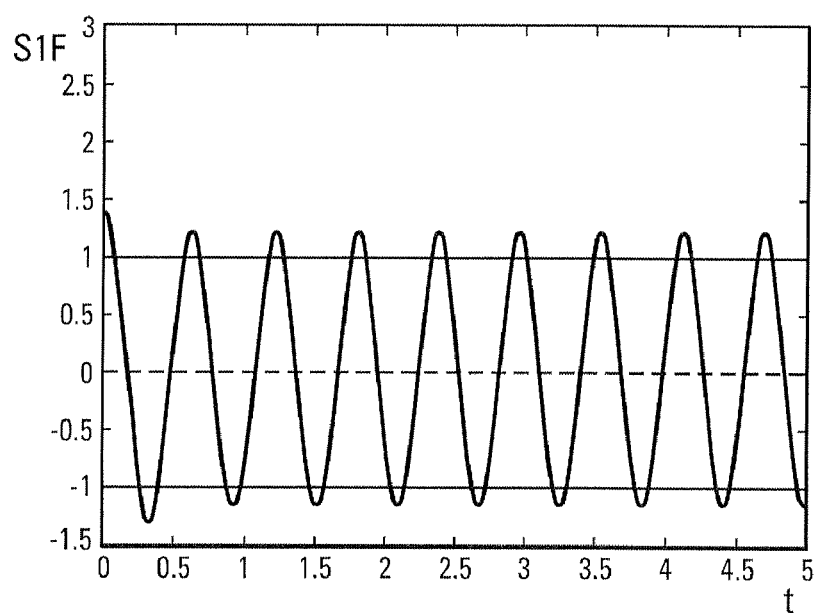
FIG. 4 shows the oscillatory failure of FIG. 3 after a filtering performed by a high-pass filter.

FIG. 3 represents a non-zero average oscillatory failure. The oscillatory failure, revealed by a signal S1, is represented as a function of the time t (expressed, for example, in seconds). A count around the 0 value is ineffective. Thus, after a filtering applied by the abovementioned high-pass filtering means, the filtered signal S1F represented in FIG. 4 is obtained, for which a count around the 0 value can be applied by the counting assembly 2 of the counting device 1 according to the invention.

Figure 5:
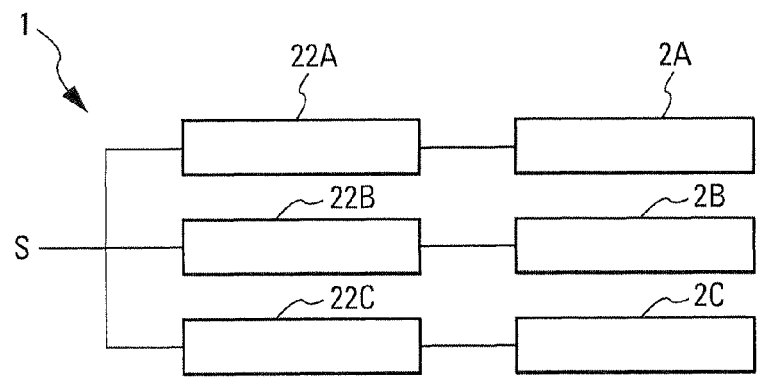
FIG. 5 is the block diagram of a particular embodiment of the counting device according to the invention.

Moreover, in a particular embodiment represented in FIG. 5, said device 1 comprises:

filtering means 22A, 22B and 22C to previously break down the oscillating time signal S respectively into a plurality of different frequency bands; and a plurality of counting assemblies 2A, 2B and 2C (similar to the assembly 2 described previously) which are linked respectively to the filtering means 22A, 22B and 22C and which are formed to perform a separate count in each frequency band formed by these filtering means.

As an illustration, this particular embodiment can break down the time signal S being studied into three frequency bands B1, B2 and B3 such that:

the band B1 presents frequencies F of 1 to 3 Hz;

the band B2 presents frequencies F of 3 to 5 Hz; and the band B3 presents frequencies F of 5 to 10 Hz.

Said filtering means 22A, 22B and 22C also make it possible to limit a counting of the transient threshold overshoots and to filter very low frequencies for which there is no desire for detections. To this end, time windows are defined, outside of which the threshold value overshoots are no longer taken into account. Furthermore, the size of each time window can be adapted to the frequency of each start-of-band. Once the frequency is increased, the size of the corresponding time window reduces, and transients are more rapidly eliminated. Another benefit of the breakdown into frequency bands B1 to B3 is that different failure levels can be set, as a function of the frequency, which corresponds to a reality at the level of the loads on the structure of the aircraft. As an illustration, it may be required to detect failures of 1° between 1 and 3 Hz, failures of 2° between 3 and 5 Hz, and failures of 0.5° between 5 and 10 Hz.

Furthermore, the breakdown into frequency bands B1 to B3 makes it possible to retain only the frequency components that are of interest, so that the processing operations are performed on residual values which are not disturbed by spurious frequencies.

Said filtering means 22A, 22B and 22C therefore contribute to the robustness of the device 1 according to the invention.

Figure 6:
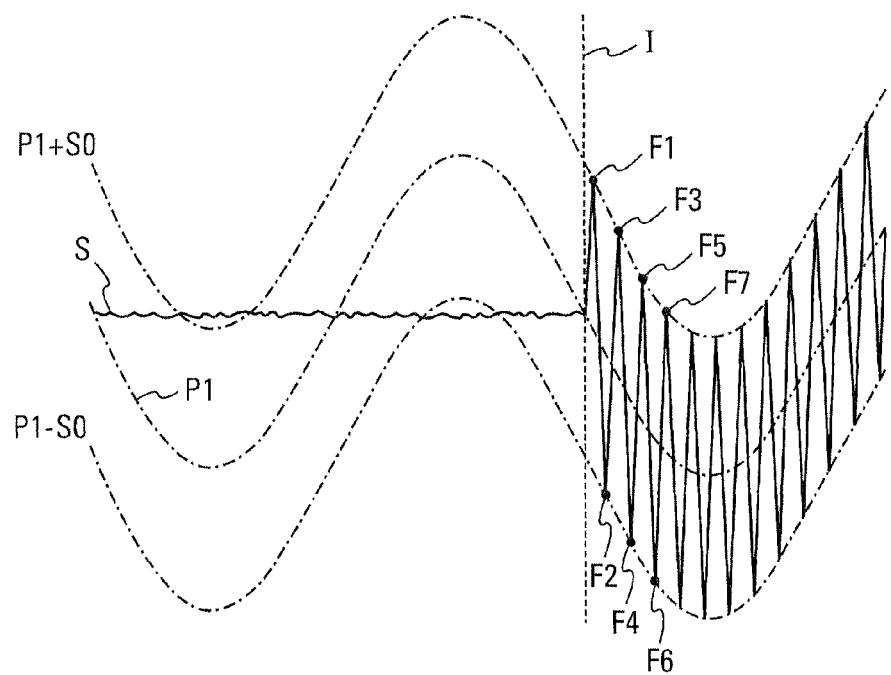
FIG. 6 diagrammatically illustrates the detection of an oscillatory failure by counting around a known particular component of the time signal to be monitored.

Moreover, it may be necessary to count the oscillations around a known particular component P1 of the signal, as represented in FIG. 6. In the example of FIG. 6, a failure appears for the signal S at an instant I. In this case, the device 1 according to the invention is formed in such a way as to count the crossings F1, F2, F3, F4, F5, F6, F7, . . . of threshold values P1+S0 and P1−S0 on the time signal S being monitored (from the instant I). These threshold values P1+S0 and P1−S0 are supplied to the comparators 3 and 7 respectively by the means 18 and 19.

The component P1 (about which a count is performed) can be:

either a constant;

or a variable value, as represented in FIG. 6 (where P1 is a sinusoidal value).

The counting device 1 according to the invention, as described hereinabove, can be used in numerous different applications. It can in particular be employed to verify the validity of a measurement of a sensor or to detect oscillations of any time signal.

However, in a preferred application, said device 1 is used in the detection of oscillatory failures relating to at least one position-mode servo-control subsystem 21 (represented in FIG. 7) of an aircraft control surface 23. In this case, the present invention can be applied to a position-mode servo-control subsystem of at least one control surface 23 such as an aileron, a spoiler, an elevator, or a rudder of a transport airplane.

Figure 7:
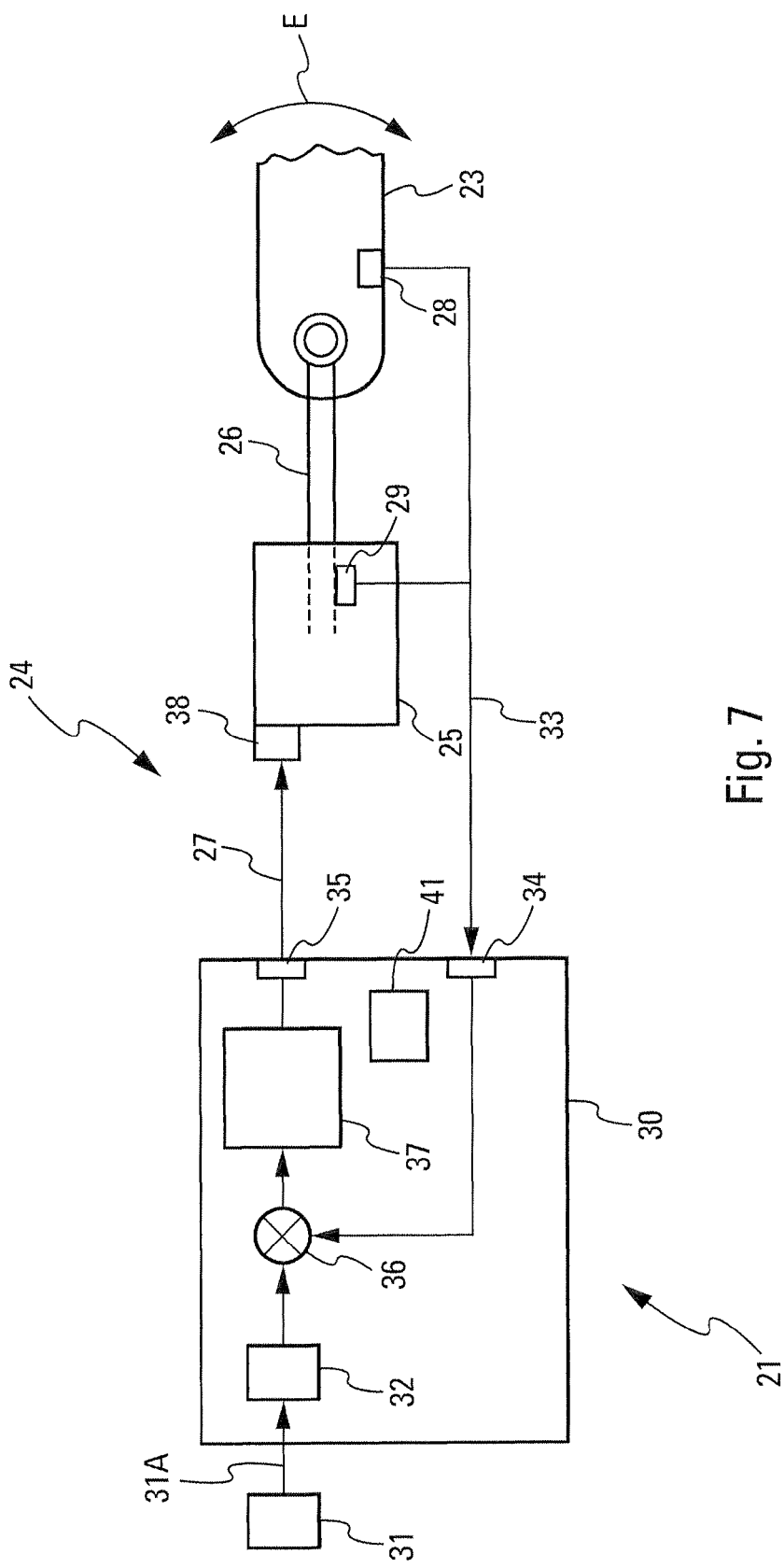
FIG. 7 diagrammatically illustrates a position-mode servo-control subsystem of an aircraft control surface, which comprises a device for automatically detecting an oscillatory failure, according to the invention.

Usually, this servo-control subsystem 21 forms part of an electrical flight control system 24 of the aircraft and comprises:

said control surface 23 which is mobile, by being able to be turned as illustrated by a double arrow E in FIG. 7, and the position of which relative to the structure of the aircraft is set by at least one usual actuator 25;

said actuator which sets the position of said control surface 23, for example through the intermediary of a rod 26 which acts on the latter, according to at least one actuation order received via a link 27;

at least one sensor 28, 29 which measures the effective position of said control surface 23. To this end, it can be a sensor 28 which is directly associated with the control surface 23 and/or a sensor 29 which measures, for example, the displacement of the rod 26 of the actuator 25; and a computer 30, for example a flight control computer:

which receives control information from means 31, via a link 31A. These means 31 are usual means for generating control information and comprise, for example, a control column which can be actuated by a pilot of the aircraft and inertial sensors;

which generates in the usual way a control surface control order, using an integrated computation means 32 which contains piloting laws and which uses, for this generation, control information (action of the pilot on the control column, parameters which indicate the position of the aircraft about its center of gravity, load factors to which it is subject) received from said means 31;

which receives the actual position measured by the sensor or sensors 28, 29 via a link 33 via an input 34 of analog type (and a means 36);

which calculates, from the preceding information (control surface control order and measured actual position), said actuation order, using an integrated computation means 37 that takes account of a predetermined gain; and which transmits this actuation order to a servo-valve 38 of the actuator 25, via the link 27 via an output 35 of analog type.

All the elements of this servo-control subsystem 21 which contain electronic components, and in particular the sensors 28, 29, the analog input 34, the analog output 35, etc., are sources of oscillatory failures, that is, of failures that are liable to generate a spurious electrical signal which can cause the control surface 23 to oscillate.

Said electrical flight control system 24 comprises, in addition to said servo-control subsystem 21, a device 41 according to the invention which is intended to detect any oscillatory failure of the abovementioned type.

Figure 8:
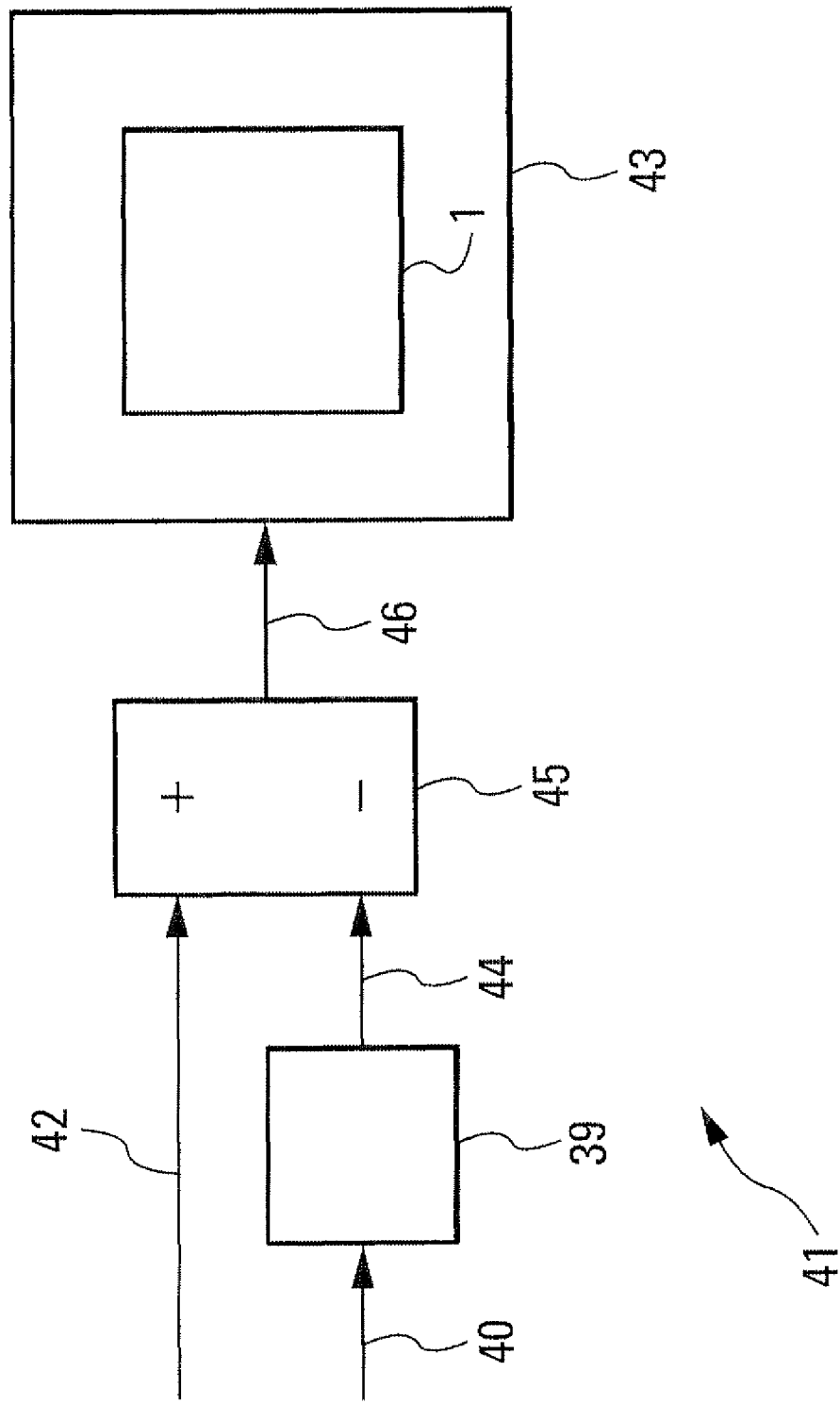
FIG. 8 is the block diagram of a device for automatically detecting an oscillatory failure, according to the invention.

To do this, said detection device 41 comprises, as represented in FIG. 8:

means 39 for determining a theoretical position which corresponds to a reference position of the control surface 23 in the absence of oscillatory failure and which conforms to the control surface control order. This theoretical position is determined using the control surface control order generated by said computation means 32 and received via a link 40 (which is, for example, linked to the output of said computation means 32), as well as the theoretical position estimated at the preceding instant, the output of the means 39 being reinjected at input;

a computation means 45 for calculating the difference between the actual position of the control surface 23 (which is measured by the sensor 28, 29 and which is received via a link 42 which is, for example, linked to said link 33) and the theoretical position (which is determined by said means 39 and which is received via a link 44) so as to form a residual value; and a processing unit 43 which is linked via a link 46 to said computation means 45 and which comprises a counting device 1 according to the invention.

This counting device 1 is intended to:

compare this residual value to at least one predetermined threshold value S0;

perform a count of all the overshoots which are both successive and alternate of said threshold value S0 by said residual value; and detect an oscillatory failure immediately the number resulting from said count becomes greater than a predetermined number.

Thus, said detection device 41 compares the real operation of the servo-control subsystem 21 being monitored (which is illustrated by the measured actual position of the control surface 23), to an ideal operation expected without failure (which is illustrated by said calculated theoretical position of the control surface 23), which makes it possible to reveal any oscillatory failure when it occurs.

Consequently, said detection device 41 is able to detect, in the servo-control subsystem 21 being monitored, any oscillatory failure of a given minimum amplitude in a given number of periods. Furthermore, this detection is particularly robust, since it does not provoke false alarms. Furthermore, the device 41 makes it possible to detect all the failure modes that exist in the servo-control subsystem 21 of the abovementioned type, and it can be applied to any type of aircraft.

We claim:

1. A device for counting oscillations of an oscillating time signal, which comprises:

a first comparator which receives said time signal and which compares it to a first threshold value which is positive;

a first AND logic gate, a first input of which is linked to the output of said first comparator;

a first two-input bistable flip-flop, a signal input of which is linked to the output of said first AND logic gate;

a first inverter which is mounted between the output of said first bistable flip-flop and the second input of said first AND logic gate;

a second comparator which also receives said time signal and which compares it to a second threshold value which is negative, the output of said second comparator being linked to an initialization input of said first bistable flip-flop;

a second AND logic gate, a first input of which is linked to the output of said second comparator;

a second two-input bistable flip-flop, a signal input of which is linked to the output of said second AND logic gate, and an initialization input of which is linked to the output of said first comparator;

a second inverter which is mounted between the output of said second bistable flip-flop and the second input of said second AND logic gate;

an OR logic gate, the two inputs of which are linked respectively to the outputs of said first and second AND logic gates, and the output of which controls a switching means to generate a unit value intended to increment a counter, each time said time signal exceeds, alternatively, one of said first and second threshold values; and said counter which is thus incremented and which handles the counting of the oscillations of said oscillating time signal.

2. The device as claimed in claim 1, which comprises, in addition, a delay unit which stores a unit value at the output of the OR logic gate for a predetermined duration before sending it to an auxiliary means mounted at the output of said counter to decrement the latter as appropriate.

3. The device as claimed in claim 1, which comprises, in addition, at least one bandpass filtering means for filtering the time signal before transmitting it to said first and second comparators.

4. The device as claimed in claim 1, which comprises, in addition, a high-pass filtering means for filtering the time signal before transmitting it to said first and second comparators.

5. The device as claimed in claim 1, which comprises, in addition, a comparison means for comparing the value obtained from said counter with a predetermined value and for sending an output signal immediately said value obtained from said counter, which represents the number of half-periods of oscillations counted, becomes greater than said predetermined value.

6. The device as claimed in claim 1, which comprises, in addition:

means for previously breaking down the oscillating time signal into a plurality of frequency bands; and means for performing a separate count in each duly formed frequency band.

7. The device as claimed in claim 1, wherein said first and second threshold values present the same absolute value.

8. A device for automatically detecting at least one oscillatory failure in at least one position-mode servo-control subsystem of at least one control surface of an aircraft, said subsystem forming part of an electrical flight control system of the aircraft and comprising:
- said control surface which is mobile, and the position of which relative to the aircraft is set by at least one actuator;
- said actuator which sets the position of said control surface, according to at least one received actuation order;
- at least one sensor which measures the actual position of said control surface; and
- a computer which generates a control surface control order, which receives said measured actual position and which deduces therefrom an actuation order which is transmitted to said actuator, said device comprising:
- first means for estimating, using said control surface control order, a theoretical position corresponding to a reference position of said control surface in the absence of failure;
- second means for calculating the difference between said theoretical position estimated by said first means and the actual position measured by said sensor so as to form a residual value; and
- third means for:
  - comparing this residual value to at least one predetermined threshold value;
  - performing a count of all the successive and alternate overshoots of said predetermined threshold value by said residual value; and
  - detecting an oscillatory failure immediately the number resulting from said count becomes greater than a predetermined number,
- wherein said third means comprise an oscillation counting device, as specified under claim 1.

9. An electrical flight control system of an aircraft, said system comprising at least one means for generating a control surface control order for at least one control surface of the aircraft and at least one position-mode servo-control subsystem of this control surface, which comprises:
- said control surface which is mobile, and the position of which relative to the aircraft is set by at least one actuator;
- said actuator which sets the position of said control surface, according to at least one received actuation order;
- at least one sensor which measures the actual position of said control surface; and
- a computer which generates said control surface control order, which receives said actual position and which deduces therefrom an actuation order which is transmitted to said actuator, which comprises, in addition, at least one device for automatically detecting at least one oscillatory failure in said servo-control subsystem, as specified under claim 8.

* * * * *